Patented May 12, 1942

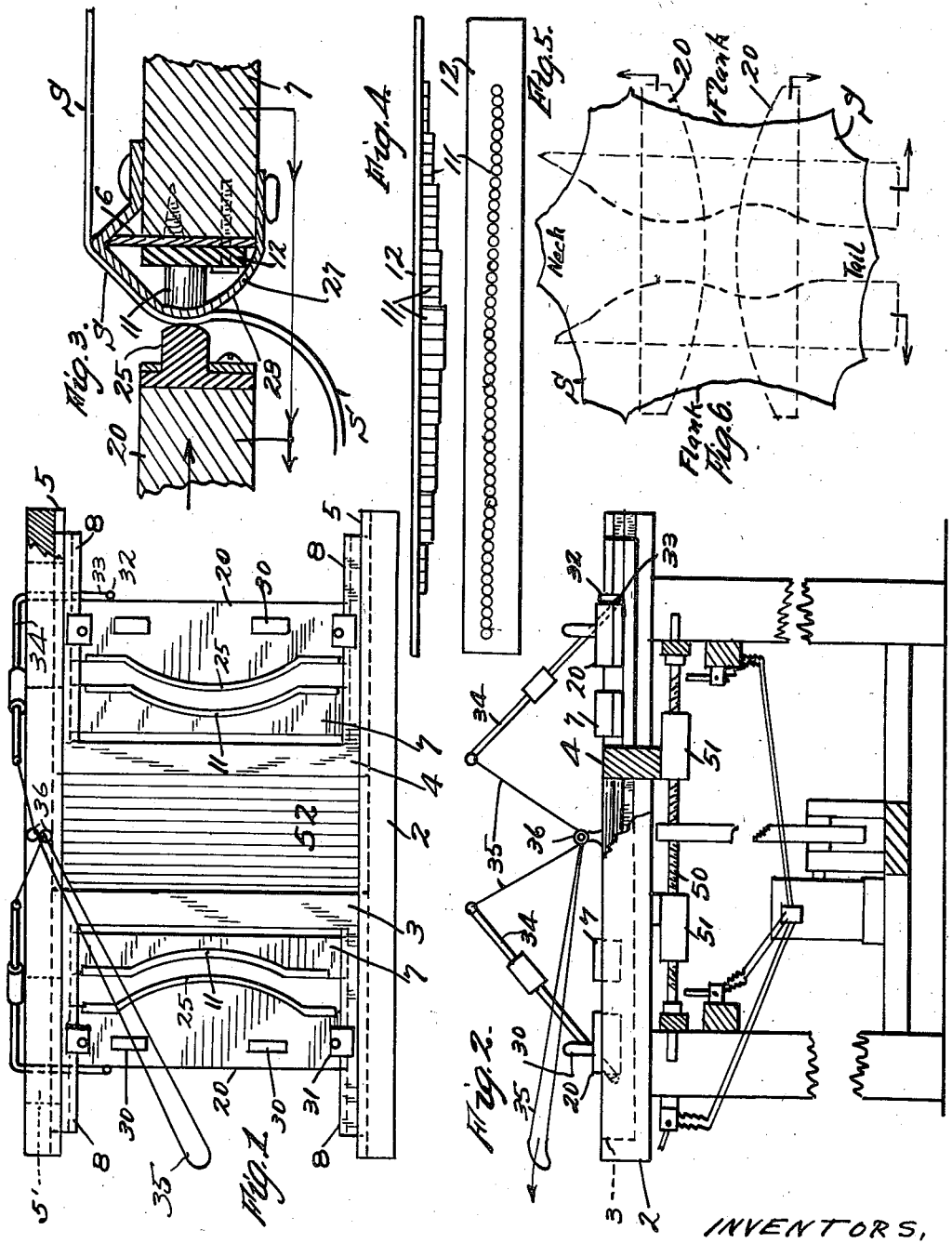

2,282,478

UNITED STATES PATENT OFFICE 2,282,478

LEATHER-STRETCHING APPARATUS

Carl Hugo Johanson, Los Angeles, Calif., and Walfrid Nordstrom, Lund, Sweden; said Nordström assignor to said Johanson; Oscar W. Hauge executor of said Carl Hugo Johanson, deceased Application October 22, 1940, Serial No. 362,234
In Sweden July 1, 1939

3 Claims. (Cl. 149—21)

This invention is an apparatus for the economical and rapid production of true size hand gloves.

It is an object of the invention to provide for the uniform disposition of latent stretch in various types of glove skins so that when the proper glove dies are employed to cut blanks from the skin each blank will have a definite, uniform and known amount of stretch for given hand size, and each blank will result in the correct length of fingers.

An object is to provide a method and apparatus in and by which a skin, or other suitable material, can be firmly gripped along two spaced and generally parallel lines and the intervening zone can be tensioned for the full length of the skin or its full width as the case may be; to provide for tensioning without slip of the gripping means, if desired at the zone from the head to the rump, and to provide for slip of the belly sides in the gripping means if so desired because the sides are softer than the back.

An object is to provide a simple and practical machine for the method which includes a set of various interchangeable gripping plates or leaves for ready application to concurrently oppositely movable slides mounted on a suitable frame.

An object is to provide means for positively moving the slides in each direction, and which operate, on separating motion, to stretch a skin gripped between relative pairs of the gripping leaves, and to provide manually operative presser devices whereby to apply additional pressure to outermost gripping leaves at will by the operative.

It is to be understood that the contour of the effective gripping edges of the leaves will be determined by given steps, that is straight edge grips are desired for stretching across the skin from side to side to uniformly stretch the stiff back and sides, but convex edges are desired when pulling the skin from neck to rump so the center of the back will have greater tension than the belly flanks which are softer.

Figure 1 is a plan of the machine with the slides and the pairs of leaves all partly opened ready for a skin to be inserted from one outermost leaf to the other. Figure 2 is a broken side elevation. Figure 3 is a detail section of gripping members of one pair of leaves (the left hand pair). Figure 4 is a top plan of a cushion bed device of a leaf, and Figure 5 is a face view of the cushion device. Figure 6 is a diagram showing convex edge leaves for length stretch of a skin, and straight edge leaves for cross stretch.

A table 2 is provided with slides 3 and 4, of U-shape plan which are concurrently moved inward, or outward, on ways 5 by suitable means such as a reverse-threaded shaft 50 suitably mounted on the table frame engaging nuts 51 on the slides. An accordion plaited or folding guard 52 connects the slides and covers the machinery to protect a skin S when draped from slide to slide to be gripped and stretched.

Inner, cross leaves 7—7 are at their ends slidably mortised and removably, interchangeably mounted on the side arms 8 of the slides 3 and 4 and the outer edge of each of the leaves 7 is suitably provided with a transverse, rigid, breaker blade 6, Fig. 3, presenting an upstanding top edge over which an applied skin is draped between leaf 7 and an outer presser leaf 20.

The gripping means includes a bed and cushion device on the leaf 7 and a relatively movable, presser assembly of which there is one on each slide outward of its leaf 7. The bed device includes a pair of continuous or substantially continuous supports or cushion pads 11 attached to a base strip 12 which may be of rubber suitably fastened to the basal edge of the leaf 7, Fig. 3.

The pads 11 are preferably in the form of rubber buttons of different degrees of hardness or resistance, being stiffer at the center, Fig. 4, to set up firmer tension when used on convex edge grips, as in Fig. 6. Opposing the cushion bed 11 on each leaf 7, there is the outer presser member or leaf 20 slideable on the arms 8 toward or from the leaves 7. The inner edge of each leaf 20 is complementary to the opposed line of the cushion pad device 11 and has a projecting, fairly stiff strip or presser nose 25, Fig. 3, to grip on the draped skin S at the cushion bed 11.

To avoid excess drag due to the contact of the rubber pad bed 11 on the skin, a pliant mantle of cloth 27, or other material, with a sleek face 28 is removably attached to each leaf 7 so that the skin can slide free when pressure is released by presser member 20.

The movable leaves 20 are provided with handles 30 so they may be hand shifted to or from the draped skin on the cushion device 11 and suitable brake means 31 mounted on the arms 8 of the slides 3 and 4 includes parts operative to engage the respective leaves.

If the operative so desires, more tension may be set up in the skin by means of a crank 32 leaning against the outer side of a relative leaf 20 and being rigid with a part of a rock shaft 33 passing pivotally through respective arms 8, as seen in Fig. 2, and having weighted, inwardly tilted arms 34. Relative crank 32 and lever arm 34 are connected by a rock shaft part 33 which shifts as to the table in a slot 5' in the table way 5. The levers 34 tilt toward each other and are hitched to a rein 35 led through pulleys 36 so that the operative can pull on both levers at one time or either of them to rock the cranks 32 inwardly and thus force the leaves 20 inward.

What is claimed is:

1. A skin stretching machine including a frame, a pair of slides operating on the frame, means for operating the slides concurrently inward together or outward together, and opposite pairs of gripping assemblies one for each slide each pair entirely removable from its slide for type change.

2. The machine of claim 1, and having brakes to set the tension effect of each gripping assembly.

3. The machine of claim 1, and each assembly including a pair of mutual leaves slidable on its slide, a brake device to set tension action of the leaves on a skin gripped thereby, and other means for applying tension in addition to the brake action on the skin.

CARL HUGO JOHANSON.
WALFRID NORDSTROM.